United States Patent
St. Denis

(10) Patent No.: US 7,012,512 B2
(45) Date of Patent: Mar. 14, 2006

(54) OBDII READINESS STATUS NOTIFICATION DEVICE

(76) Inventor: Michael St. Denis, 1641 Grey Owl Cir., Roseville, CA (US) 95661

( * ) Notice: Subject to any disclaimer, the term of this patent is extended or adjusted under 35 U.S.C. 154(b) by 114 days.

(21) Appl. No.: 10/824,296

(22) Filed: Apr. 14, 2004

(65) Prior Publication Data
US 2006/0030980 A1 Feb. 9, 2006

(51) Int. Cl.
*B60Q 1/00* (2006.01)

(52) U.S. Cl. .................. 340/438; 340/426.15; 340/439; 701/29; 701/30; 701/33; 701/185

(58) Field of Classification Search ............... 340/438, 340/439, 426.15, 679; 701/29, 30, 33, 185
See application file for complete search history.

(56) References Cited

U.S. PATENT DOCUMENTS

| 6,032,088 A | 2/2000 | Feldmann et al. |
| 6,529,808 B1 | 3/2003 | Diem |
| 6,636,790 B1 | 10/2003 | Lightner et al. |
| 6,931,309 B1 * | 8/2005 | Phelan et al. ............. 701/1 |

* cited by examiner

*Primary Examiner*—Daryl C Pope
(74) *Attorney, Agent, or Firm*—Stites & Harbison, PLLC; David W. Nagle, Jr.

(57) ABSTRACT

A device for notifying an operator of the readiness of a vehicle for emissions testing includes a control logic for evaluating the status of each of a plurality of the monitors of an on-board diagnostics (OBDII) system of the vehicle. Once the vehicle is determined to be ready for emissions testing based on the status of each evaluated monitor of the OBDII system, an indicator light is illuminated and/or an audio signal is emitted to notify the operator.

21 Claims, 7 Drawing Sheets

OBDII READINESS STATUS NOTIFICATION DEVICE

BACKGROUND OF THE INVENTION

The present invention relates to vehicle emissions testing, and, more particularly, to a device that notifies a vehicle operator that the vehicle is ready for an emissions inspection.

Recognizing the adverse effects that vehicle emissions have on the environment, the 1990 Clean Air Act requires that communities in geographic regions having high levels of air pollution implement Inspection and Maintenance ("I/M") programs for vehicles in the particular geographic regions. Such I/M programs are intended to improve air quality by periodically testing the evaporative and exhaust emissions control systems of vehicles in the community and ensuring their proper operation and maintenance. By ensuring that the evaporative and exhaust emissions control systems of vehicles are operational and properly maintained, air pollution resulting from vehicle emissions in the geographic region should be drastically reduced.

I/M programs in the United States typically employ some method of "tailpipe" testing as the primary means of inspection. Although there are several variations of common tailpipe testing, the core function of tailpipe testing remains the same. First, a probe is attached to, or inserted into, the tailpipe of the vehicle being tested to collect exhaust as the engine of the vehicle is running. The collected exhaust is then introduced into a series of gas analyzers in order to determine its composition. Finally, a report of the amount of measured pollutants is generated.

In 1992, the California Air Resources Board (CARB) proposed regulations for the monitoring and evaluation of a vehicle's emissions control system through the use of second-generation on-board diagnostics ("OBDII"). (See California Code of Regulations, Title 13, 1968.1—Malfunction and Diagnostic Systems Requirements—1994 and subsequent model year passenger cars, light-duty trucks, and medium-duty vehicles with feedback fuel control systems.) These regulations were later adopted by the United States Environmental Protection Agency. (See Environmental Protection Agency, 40 C.F.R. Part 86—Control of Air Pollution From New Motor Vehicles and New Motor Vehicle Engines; Regulations Requiring On-Board Diagnostic Systems on 1994 and Later Model Year Light-Duty Vehicles and Light-Duty Trucks.) As a result, OBDII systems were required to be phased in beginning in 1994, and by 1996, almost all light-duty, gasoline-powered motor vehicles in the United States were required to have OBDII systems.

In general, through the use of OBDII systems, the emissions control system of a vehicle is constantly monitored, with a "check engine" light or Malfunction Indicator Light (MIL) on the dashboard of the vehicle being illuminated to inform the operator of a problem with the emissions control systems. The OBDII system is commonly interrogated as part of I/M programs to ensure it is functioning properly.

Discussing now the more specific operational details, OBDII systems are designed to monitor certain emissions control systems, i.e., groupings of related vehicle emissions components, to ensure they are functioning properly. Each such emissions control system is evaluated by a "monitor," which also may be referred to as an "OBDII monitor" or a "readiness monitor." CARB designates eleven monitors that the OBDII system of a vehicle may be required to evaluate:

TABLE A

| MONITOR | TYPE |
| --- | --- |
| Fuel Metering/Trim | Continuous |
| Misfire | Continuous |
| Comprehensive Component | Continuous |
| Air Conditioning | Unsupported |
| Catalyst Heater | Unsupported |
| Catalyst | Non-continuous |
| Oxygen Sensor | Non-continuous |
| Oxygen Sensor Heater | Non-continuous |
| Evaporative Emissions Control System | Non-continuous |
| Secondary Air | Non-continuous |
| Exhaust Gas Recirculation | Non-continuous |

As indicated in Table A, the first three monitors are "continuous" in that evaluation of the particular emissions control system is ongoing at any time the vehicle engine is operating. For this reason, these three monitors are always reported by the OBDII system as being "ready," meaning that the system has been evaluated. In this regard, it is important to recognize that a status of "ready" does not mean that the particular emissions control system is operating properly, but only that the system has been evaluated. If a particular vehicle emissions system has been evaluated, and a fault is found with the system, the check engine light or MIL will be illuminated.

Referring still to Table A, although identified in the applicable regulations, the air conditioning and catalyst heater monitors are not included in most vehicles and are therefore reported by the OBDII system as "unsupported."

Finally, the remaining six monitors are characterized as "non-continuous" because if the vehicle supports them, functionality of the particular emissions control system can only be evaluated after the vehicle has been operating for a predetermined time period or until certain conditions are satisfied. Accordingly, a non-continuous monitor will be reported by the OBDII system as "not ready" until the predetermined time period has elapsed or the certain conditions have been satisfied. For example, assuming a non-continuous monitor is supported, the monitor will have a status of "not ready" when the vehicle is brand new (since the monitor has not yet had an opportunity to evaluate the emissions control system), if the battery has been disconnected for a period of time (such that computer memory is cleared), or if a technician performs specific operations on the OBDII system. After the vehicle has been operated until the predetermined time period has elapsed or the certain conditions have been satisfied, each monitor will evaluate its emissions control system, and the status of each monitor will then be reported as "ready." The status continues to be reported as "ready" until reset by a technician or the battery of the vehicle is disconnected.

For example, the catalyst monitor evaluates whether the catalyst is functioning properly. This is generally accomplished through the use of two oxygen sensors, one upstream of the catalyst and one downstream of the catalyst. On a properly operating vehicle, the engine will vary from operating slightly lean (excess oxygen) to slightly rich (excess fuel). A common three-way catalyst, a catalyst that reduces the levels of hydrocarbons, carbon monoxide, and oxides of nitrogen, captures and stores the excess oxygen in the exhaust during the slightly lean periods, and then uses that oxygen during the periods of slightly rich operation to oxidize the hydrocarbons to carbon dioxide and water and to oxidize the carbon monoxide to carbon dioxide. Therefore, if a catalyst is functioning properly, the oxygen sensor upstream of the catalyst should measure a fluctuation in the oxygen content in the exhaust, but the downstream oxygen sensor should measure a much lower fluctuation in the oxygen content in the exhaust (since the oxygen is being absorbed by the catalyst and then converted into other molecules before passing the downstream oxygen sensor). If, however, the upstream and downstream sensors measure the same fluctuation in the oxygen content in the exhaust gas, it is an indication that the catalyst is not storing the excess oxygen and is therefore probably not oxidizing the hydrocarbons and carbon monoxide. Accordingly, the OBDII system may activate the check engine light to notify the vehicle operator that there is a problem with this emissions control system.

However, the catalyst functions properly only under specific conditions, and thus, the OBDII catalyst monitor often cannot immediately evaluate the catalyst after the OBDII memory is cleared and the catalyst monitor is reset to "not ready." For instance, if the catalyst is cold, or if one of the oxygen sensors is not functioning properly, then the system cannot evaluate the catalyst function. Until the catalyst is in condition to be evaluated, the catalyst monitor will report a status of "not ready." Once the appropriate conditions have been satisfied, the catalyst is evaluated, and the catalyst monitor is reported as "ready."

In the past, I/M programs have often included under-hood visual and functional inspections of emissions control components combined with tailpipe emissions tests to determine if the emissions control systems of a vehicle are functioning properly. However, in recent years, an increasing number of I/M programs have been inspecting 1996 and newer vehicles by using electronic interrogation of the OBDII system to determine if the emissions control systems of a vehicle are functioning properly. Such testing is described in detail in "Performing Onboard Diagnostic System Checks as Part of a Vehicle Inspection and Maintenance Program," EPA 420-R-01015 (June 2001), a report that is incorporated herein in its entirety by this reference.

However, if the battery of a vehicle is disconnected for a period of time, the OBDII system memory is cleared. If there was a fault previously identified by the OBDII system that caused the MIL to be illuminated, it will also be cleared. If the vehicle is tested in an I/M program via the OBDII system shortly after having the battery disconnected, the OBDII system may now appear not to have a problem because the OBDII system may not have had a chance to find the fault again before the I/M OBDII emissions inspection.

Furthermore, I/M program regulations typically require service technicians to clear the OBDII memory after repairs are performed. This is done so that when the OBDII system of the vehicle is checked after the repair to determine if the problem has been appropriately remedied, it is clear if the monitor for the system that was repaired has run and checked the repaired system. Again, if a particular system has been evaluated, it will be reported as "ready." If it has not been evaluated, it will be reported as "not ready."

Because unscrupulous vehicle operators, recognizing that there is a problem with an emissions control system because the MIL is illuminated, could attempt to conceal a known defect by disconnecting the battery to clear the OBDII system memory, I/M programs require a check of the readiness monitors to verify that the OBDII system has evaluated the emissions control systems. Because of the check for readiness, if the battery was disconnected just before the test to clear an illuminated MIL, various monitors will be reported as "not ready," and thus, the vehicle will not be allowed to pass the I/M OBDII emissions inspection. Furthermore, it is possible that through normal operation, all of the monitors in a vehicle may not be set to "ready." Therefore, the EPA has suggested in its guidance on performing I/M OBDII emissions inspections that vehicles with model years of 1996–2000 should be considered ready if two or fewer of the non-continuous monitors are "not ready." For 2001 and newer vehicles, one non-continuous monitor may be reported as "not ready." Furthermore, in a few states, three monitors are allowed to be "not ready," and the vehicle is still considered ready for the OBDII I/M emissions inspection.

As mentioned above, if a vehicle fails an I/M OBDII emissions inspection and is repaired, the OBDII memory will be cleared and monitors will be reset to "not ready." Since the vehicle cannot pass an emissions inspection until only a few monitors of the OBDII system are reporting their status as "not ready," the technician may instruct the vehicle operator to drive the vehicle for a period of time and then return so the technician can check to see if the vehicle is ready to be tested. Because the technician cannot tell the vehicle operator how long they should drive the vehicle to get it ready, and vehicle operators are not pleased to return for an inspection only to discover that too many monitors are still reporting their status as "not ready," there is a need for a device that can communicate to and notify a vehicle operator that a vehicle is ready for an I/M OBDII emissions inspection.

SUMMARY OF THE INVENTION

The present invention is a device that notifies a vehicle operator that the vehicle is ready for an I/M OBDII emissions inspection. In one exemplary embodiment, the notification device includes a housing that encloses a circuit board with a control logic responsible for the function and operation of the notification device. At one end of the housing, there is a connection port designed to mate with the Diagnostic Link Connector (DLC) of a vehicle, placing the control logic of the notification device in electrical communication with the OBDII system of the vehicle. At the other end of the housing, there are preferably two indicator lights, a first indicator light being illuminated to indicate that the vehicle is not ready for an I/M OBDII emissions inspection, and the second light being illuminated when the vehicle is ready for an I/M OBDII emissions inspection.

In operation, the control logic of the notification device evaluates the status of a plurality of the respective monitors of the OBDII system. Based on such an evaluation, and specifically a count of the number of monitors reporting as "not ready," the notification device will either illuminate the "not ready" light if the vehicle is not ready for an I/M OBDII emissions inspection, or the "ready" light if the vehicle is ready for an I/M OBDII emissions inspection. Additionally, the notification device may have a speaker to emit an audio signal, in lieu of or in addition to the visual indicator, when the OBDII system of the vehicle is ready for an I/M OBDII emissions inspection.

As a further refinement, the notification device may also include two selector switches on a surface of the housing. The first selector switch allows an operator to indicate the number of readiness monitors of the OBDII system that will be allowed to be reported as "not ready," while still allowing the device to report the vehicle as being ready to be tested. The second selector switch allows an operator to indicate whether the catalyst monitor must be reporting as "ready" in order for the notification device to report the vehicle as being ready to be tested.

As yet a further refinement, the notification device may also include a third selector switch used to indicate how the notification device will notify the vehicle operator when the OBDII system of the vehicle is ready for an I/M OBDII emissions inspection. In this regard, the selector switch can be set to "audio," and the notification device will emit an audio signal when the vehicle is ready for an I/M OBDII emissions inspection. Alternatively, the selector switch can be set to "visual," and the notification device will illuminate the "not ready" light if the vehicle is not ready for an I/M OBDII emissions inspection. Once the vehicle is ready for an I/M OBDII emissions inspection, the notification device will then illuminate the "ready" light. If the selector switch is set to "both," then both the audio and visual signaling techniques will be used when the vehicle is ready for an I/M OBDII emissions inspection.

As yet a further refinement, the notification device may include six additional indicator lights, each of which corresponds to a particular non-continuous monitor of the OBDII system. When a monitor has been checked and is reporting as "ready" or "unsupported," the corresponding indicator light is illuminated to notify the operator of the status of that particular monitor.

DETAILED DESCRIPTION OF THE INVENTION

The present invention is a device that notifies a vehicle operator that the vehicle is ready for an I/M OBDII emissions inspection.

Figure 3:
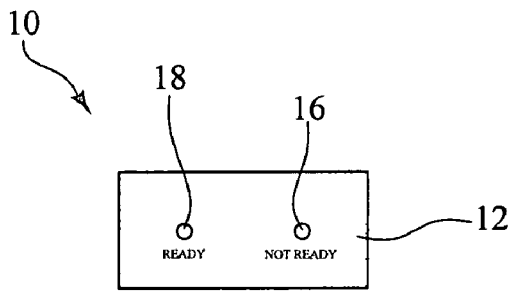
FIG. 3 is a second end view of the exemplary notification device of FIG. 1.
Figure 1:
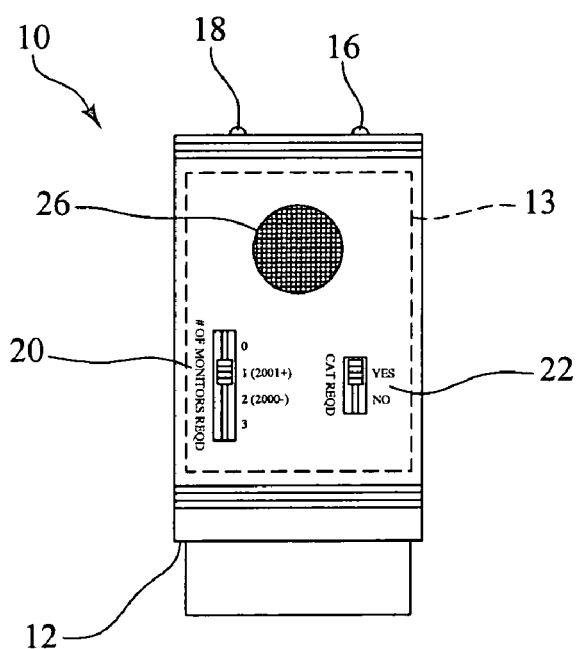
FIG. 1 is a plan view of the face of an exemplary notification device made in accordance with the present invention.
Figure 2:
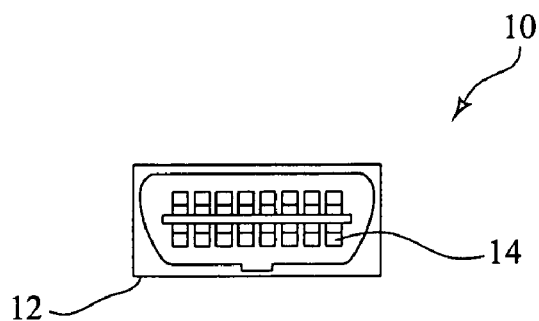
FIG. 2 is an end view of the exemplary notification device of FIG. 1.

FIGS. 1–3 are views of an exemplary notification device 10 made in accordance with present invention. The notification device 10 is generally comprised of a housing 12 that encloses a circuit board with a control logic (as illustrated in phantom and indicated by reference numeral 13) responsible for the function and operation of the notification device 10, as will be further discussed below.

At one end of the housing 12, as best shown in FIG. 2, there is a connection port 14 designed to mate with the Diagnostic Link Connector (DLC) of a vehicle, placing the control logic 13 of the notification device 10 in electrical communication with the OBDII system of the vehicle. The DLC is also the connection point for an OBD scanning device for interrogating the OBDII system, and the DLC is usually located beneath the dashboard on the driver's side of the vehicle, or in a similar, reasonably accessible location.

At the other end of the housing 12, there are preferably two indicator lights 16, 18, a first indicator light 16 being illuminated to indicate that the vehicle is not ready for an I/M OBDII emissions inspection, and the second light 18 being illuminated when the vehicle is ready for an I/M OBDII emissions inspection, as will be further discussed below.

Finally, in this exemplary embodiment, there are two selector switches 20, 22 and a speaker 26 on the front surface of the housing 12. The first selector switch 20 allows an operator to indicate the number of readiness monitors of the OBDII system that will be allowed to be reported as "not ready," while still allowing the emissions inspection to proceed. For example, the second selector switch 20 can be set so that the notification device 10 will indicate the vehicle is ready for an I/M OBDII emissions inspection when: (a) all of the monitors are reporting as "ready," i.e., a setting of "0"; (b) only one monitor is reporting as "not ready," i.e., a setting of "1"; (c) two monitors are reporting as "not ready," i.e., a setting of "2"; or (d) three monitors are reporting as "not ready," i.e., a setting of "3."

The second selector switch 22 allows an operator to indicate whether the catalyst monitor must be reporting as "ready" in order for the notification device 10 to report the vehicle as being ready to be tested. In this regard, some inspection authorities require that the catalyst monitor be functioning properly regardless of the monitor count described above. Thus, if the selector switch 22 is set to "yes," then the catalyst monitor must be reporting as "ready" for the notification device 10 to consider the vehicle ready for an I/M OBDII emissions inspection. However, if the selector switch 22 is set to "no," then the status of the catalyst monitor is not separately considered in determining if the vehicle is ready for an I/M OBDII emissions inspection.

The notification device 10 will thus illuminate the "not ready" light 16 (which is preferably red in color) if the vehicle is not ready for an I/M OBDII emissions inspection. Once the vehicle is ready for an I/M OBDII emissions inspection, the "not ready" light 16 will be extinguished, and the notification device 10 will illuminate the "ready" light 18 (which is preferably green in color). Furthermore, in this exemplary embodiment, when the OBDII system of the vehicle is ready for an I/M OBDII emissions inspection, the notification device 10 will also emit an audio signal through the speaker 26. Alternatively, such an audio signal could be emitted through the vehicle radio, for example, by transmitting the audio signal through the power line of the OBDII system to the radio, without departing from the spirit and scope of the present invention.

Referring now to the flow charts of FIGS. 4–6, the exemplary notification device 10 described above operates as follows. As should be clear from the above description, the connection port 14 of the notification device 10 is inserted into and mated with the Diagnostic Link Connector (DLC) of the vehicle as indicated by block 200 of FIG. 4, the same connector used for connection an OBD scanning device for interrogating the OBDII system. The notification device 10 draws power from the vehicle through one of the connector pins (commonly, pin 16), as indicated by block 202, and thus once powered, the notification device 10 sequentially attempts communication via one of the five standard OBDII communications protocols, as illustrated by decisions 204, 206, 208, 210, 212 of FIG. 4. Specifically, the five standard OBDII communications protocols, each of which is known to and understood by one of ordinary skill in the art, are as follows: (1) SAE J1850 Variable Pulse Width ("VPW") Modulation; (2) SAE J1850 Pulse Width Modulation ("PWM"); (3) ISO 9141-2 ("ISO"); (4) ISO 14230-4 ("Key Word Protocol 2000" or "KWP 2000"); and (5) SAE J2284 ("Controller Area Network" or "CAN") and also defined in ISO WD 15765-4 and ISO DIS 15031-5.

Figure 4:
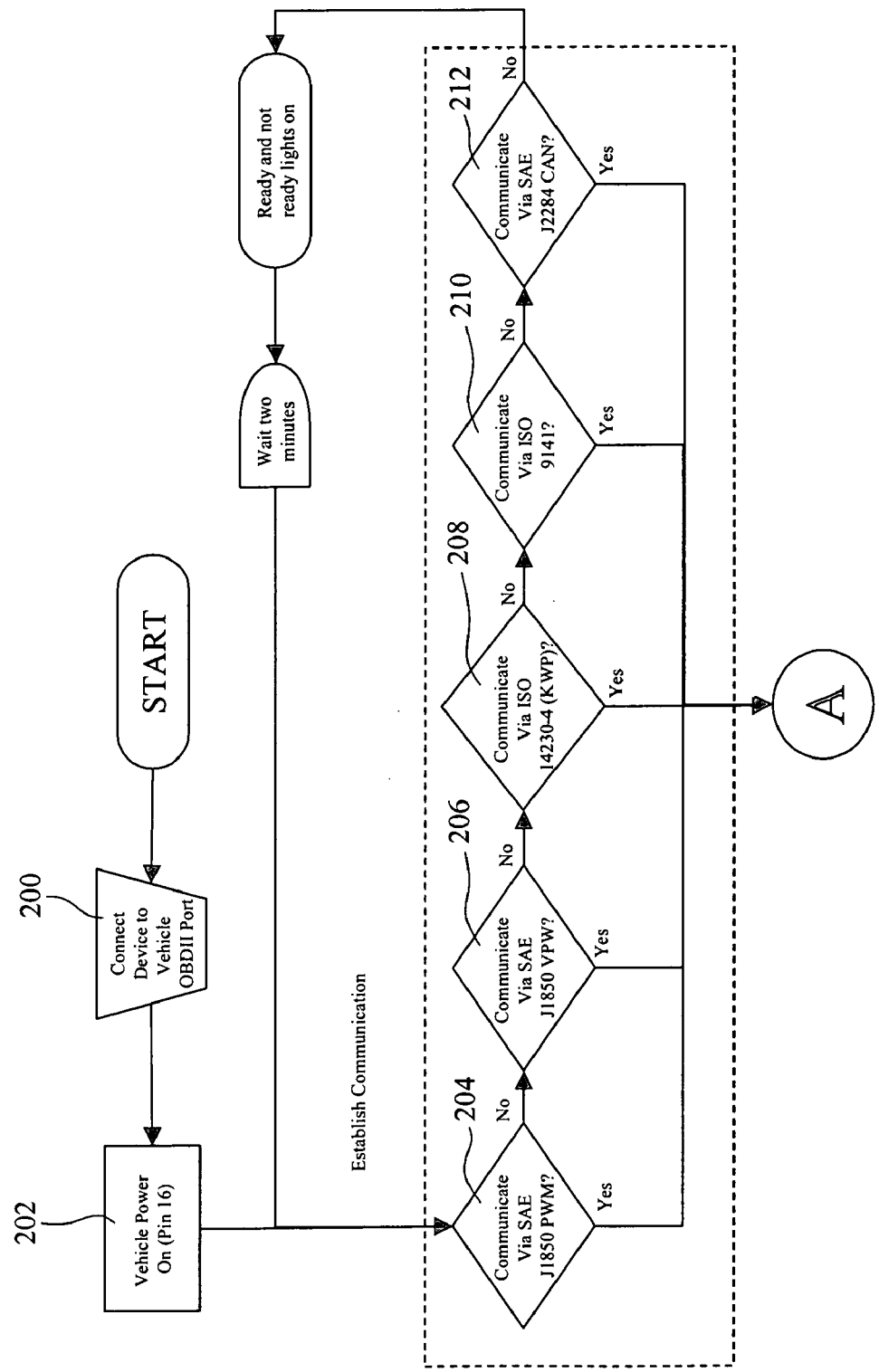
FIGS. 4–6 are flow charts illustrating the function and operation of the exemplary notification device of FIG. 1.

If communication cannot be established, in this exemplary embodiment, the notification device 10 will illuminate both the "not ready" light 16 and the "ready" light 18 (shown in FIGS. 1 and 3), as indicated at block 214 of FIG. 4. Of course, other visual and/or audio cues could be used to notify the operator that communication can not be established without departing from the spirit and scope of the present invention. In any event, in this exemplary embodiment, the notification device 10 waits for a predetermined time period (e.g., two minutes), as indicated at block 216 of FIG. 4, and then re-attempts to establish communication, again via one of the five standard OBDII communications protocols.

Figure 5:
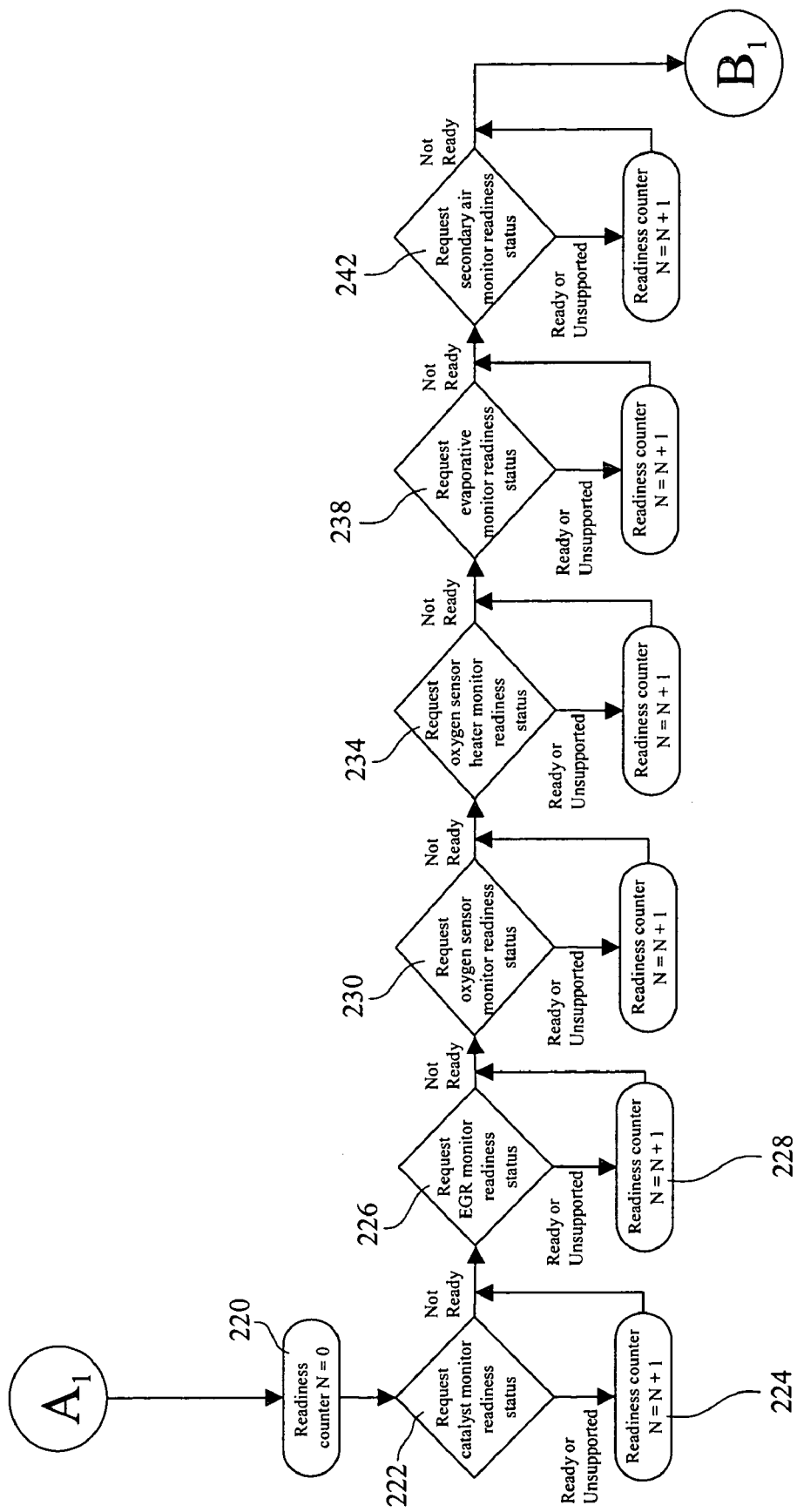

Referring now to the flow chart of FIG. 5, once communication is established, a readiness counter, N, is set at zero, meaning that none of the non-continuous monitors have yet been checked or verified as "ready," as indicated at block 220 of FIG. 5. Then, the notification device 10 electronically requests the readiness status of each of the six non-continuous OBDII monitors per SAE J1979, a well-known protocol commonly used by manufactures of OBD scanning tools. These requests are illustrated by decisions 222, 226, 230, 234, 238 and 242 of FIG. 5. For example, in the methodology illustrated in FIG. 5, the catalyst monitor is the first monitor to be checked to determine if it is "ready" (or "unsupported"). If so, the readiness counter is incremented by a value of one (N=N+1), as indicated at block 224 of FIG. 5, and then, the next monitor is checked. In this example, that second monitor is the exhaust gas recirculation monitor. If this monitor is reporting as "ready" (or "unsupported"), the readiness counter again is incremented by a value of one (N=N+1), as indicated at block 228 of FIG. 5, and then, the next monitor is checked. This process continues until all six non-continuous monitors have been checked. Of course, if a particular monitor is reporting as "not ready," no value is added to the readiness counter.

Figure 6:
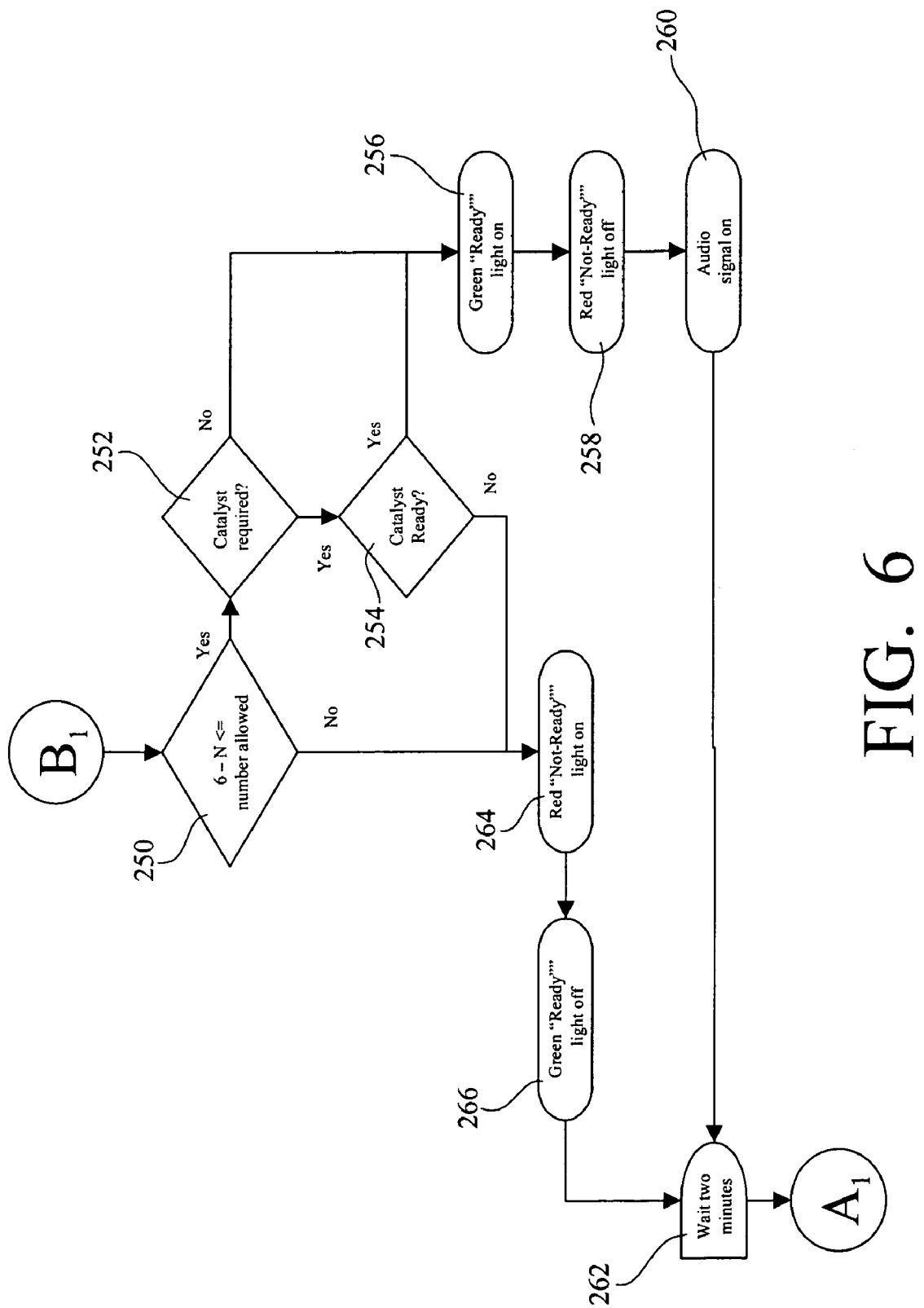

Referring now to FIG. 6, once all non-continuous monitors have been checked, the readiness counter will have a value, N, equal to the number of monitors that were reporting as "ready" or "unsupported." Accordingly, the value 6–N represents the number of non-continuous monitors that were reporting as "not ready." Thus, at decision 250, the value 6–N is compared to the value established by the selector switch 20 (as described above with reference to FIG. 1). If the value 6–N is less than or equal to the value established by the selector switch 20, the vehicle is ready for an I/M OBDII emissions inspection, at least with respect to the number of monitors that can be reported as "not ready." If the selector switch 22 (as also described above with reference to FIG. 1) is set to "yes," as indicated at decision 252 of FIG. 6, then another determination must be made. Specifically, as indicated at decision 254, the notification device 10 independently checks whether the catalyst monitor is reporting as "ready," and if so, the vehicle is ready for an I/M OBDII emissions inspection. Accordingly, the "ready" light 18 (as shown in FIGS. 1 and 3) is illuminated, as indicated at block 256, and the "not ready" light 16 (as also shown in FIGS. 1 and 3) is extinguished, as indicated at block 258. Then, an audio signal is also emitted, as indicated at block 260. Finally, as illustrated in the flow chart of FIG. 6, after a predetermined time period (e.g., two minutes), as indicated at block 262, the process is re-initiated with the notification device 10 again electronically requesting the readiness status of each of the six non-continuous OBDII monitors.

Referring still to FIG. 6, if the value 6–N is greater than the value established by the selector switch 20 at decision 250, or if the catalyst monitor is required to be "ready" and is reporting as "not ready" at decisions 252, 254, then the vehicle is not ready for an I/M OBDII emissions inspection. Accordingly, the "not ready" light 16 (as shown in FIGS. 1 and 3) is illuminated, as indicated at block 264, and the "ready" light 18 (as also shown in FIGS. 1 and 3) is extinguished, as indicated at block 266. Then, after a predetermined time period (e.g., two minutes), as indicated at block 262, the process is re-initiated with the notification device 10 again electronically requesting the readiness status of each of the six non-continuous OBDII monitors.

Figure 9:
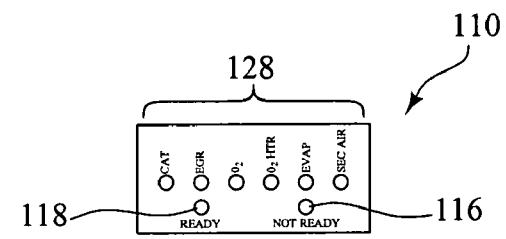
FIG. 9 is a second end view of the second exemplary notification device of FIG. 7.
Figure 7:
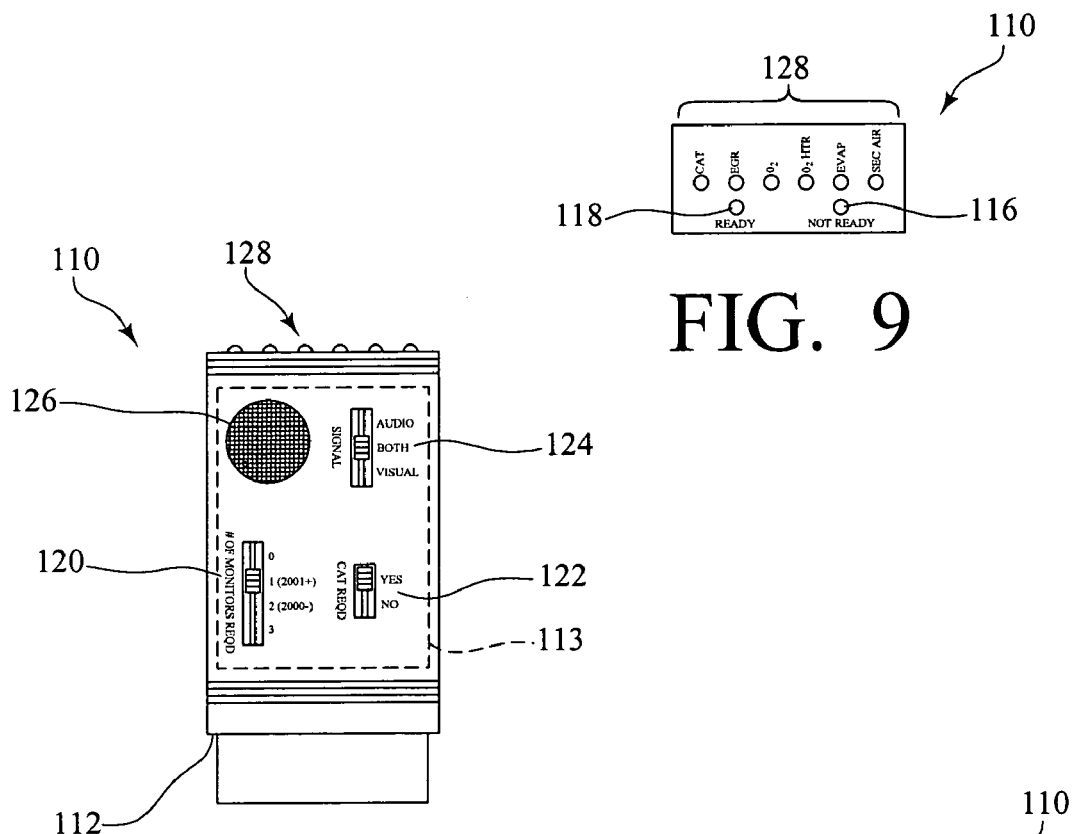
FIG. 7 is a plan view of the face of a second exemplary notification device made in accordance with the present invention.
Figure 8:
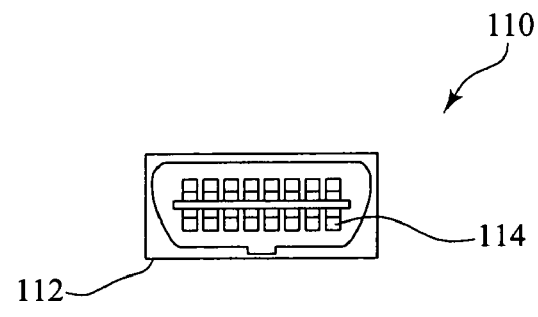
FIG. 8 is an end view of the second exemplary notification device of FIG. 7.

FIGS. 7–9 are views of a second exemplary notification device 110 made in accordance with present invention. The notification device 110 is constructed in manner substantially identical to that of the exemplary embodiment described above with reference to FIGS. 1–3, generally comprising a housing 112 that encloses a circuit board with a control logic (as illustrated in phantom and indicated by reference numeral 113) responsible for the function and operation of the notification device 110.

At one end of the housing 112, as best shown in FIG. 8, there is a connection port 114 designed to mate with the DLC of a vehicle, placing the control logic 113 of the notification device 110 in electrical communication with the OBDII system of the vehicle. At the other end of the housing 12, there are preferably two indicator lights 116, 118, a first indicator light 116 being illuminated to indicate that the vehicle is not ready for an I/M OBDII emissions inspection, and the second light 118 being illuminated when the vehicle is ready for an I/M OBDII emissions inspection. There are also six additional indicator lights, collectively indicated by reference numeral 128 in FIG. 9, each of which corresponds to a particular non-continuous monitor.

Furthermore, in this exemplary embodiment, there are three selector switches 120, 122, 124 and a speaker 126 on the front surface of the housing 112. As with the exemplary embodiment described above with reference to FIGS. 1–3, the first selector switch 120 allows a operator to indicate the number of readiness monitors of the OBDII system that will be allowed to be reported as "not ready," while still allowing the emissions inspection to proceed, and the second selector switch 122 allows an operator to indicate whether the catalyst monitor must be reporting as "ready" in order for the notification device 110 to report the vehicle as being ready to be tested.

Lastly, in this exemplary embodiment, the third and final selector switch 124 is used to indicate how the device 110 should notify the vehicle operator when the OBDII system of the vehicle is ready for an I/M OBDII emissions inspection. In this regard, the selector switch 124 can be set to "audio," and the notification device 110 will emit an audio signal through the speaker 126 when the vehicle is ready for an I/M OBDII emissions inspection. Alternatively, the selector switch 124 can be set to "visual," and the notification device will illuminate the "not ready" light 116 (which is preferably red in color) if the vehicle is not ready for an I/M OBDII emissions inspection. Once the vehicle is ready for an I/M OBDII emissions inspection, the "not ready" light 116 will be extinguished, and the notification device 110 will illuminate the "ready" light 118 (which is preferably green in color). If the selector switch 124 is set to "both," then both the audio and visual signaling techniques will be used when the vehicle is ready for an I/M OBDII emissions inspection.

Referring again to the flow chart of FIG. 4, as with the exemplary embodiment of the notification device 10 described above with reference to FIGS. 1–3, the connection port 114 of the notification device 110 is inserted into and mated with the DLC of the vehicle and then attempts communication via one of the five standard OBDII communications protocols.

Figure 10:
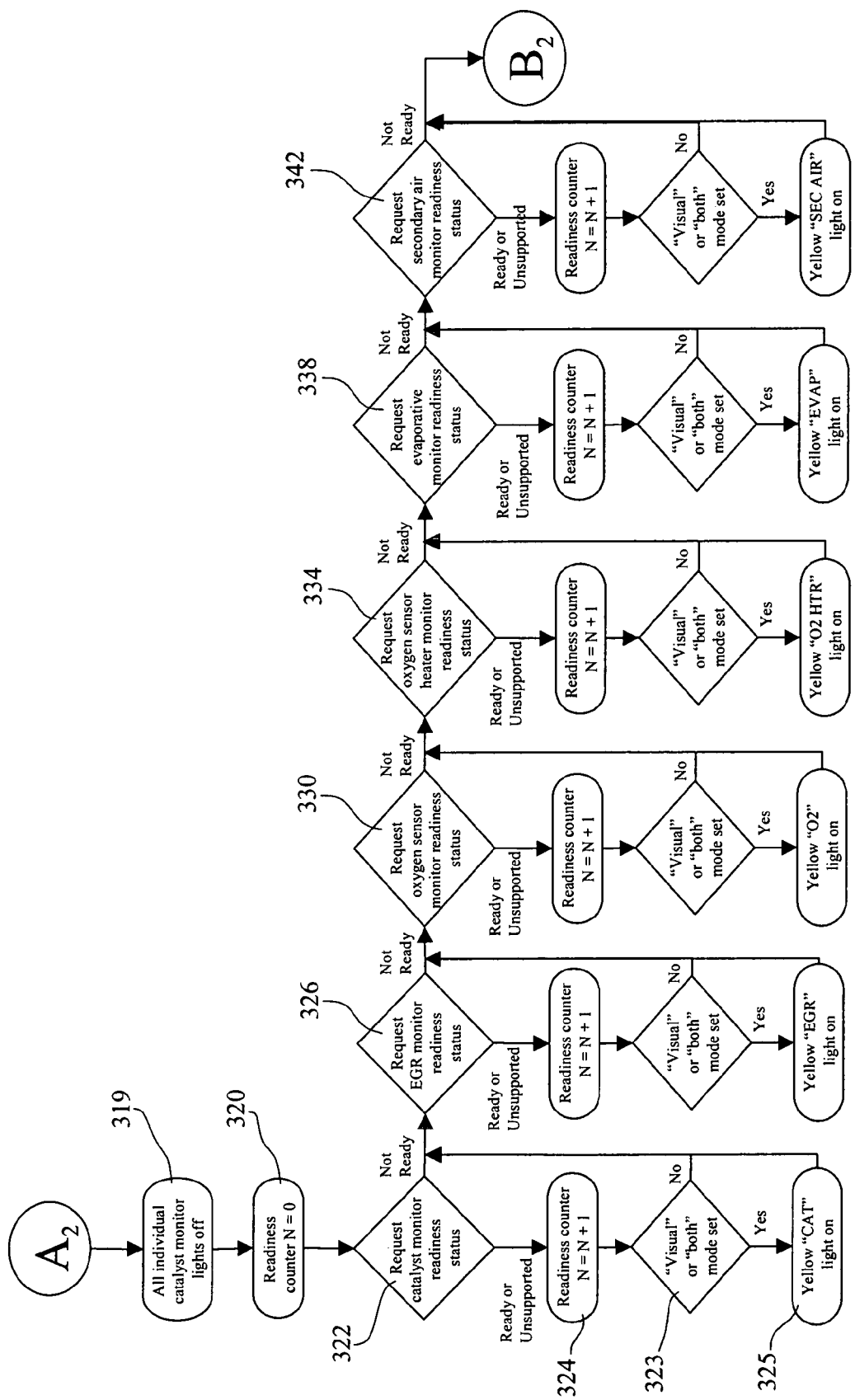
FIGS. 10–11 are flow charts illustrating the function and operation of the exemplary notification device of FIG. 7.

Referring now to FIG. 10, once communication is established, this exemplary notification device 110 operates as follows. First, the six additional indicator lights, which are collectively indicated by reference numeral 128 in FIG. 9, are extinguished, as indicated at block 319 of FIG. 10. Furthermore, a readiness counter, N, is again set at zero, as indicated at block 320 of FIG. 10. Then, the notification device 110 electronically requests the readiness status of each of the six non-continuous OBDII monitors per SAE J1979, as illustrated by decisions 322, 326, 330, 334, 338 and 342 of FIG. 10.

For example, in the methodology illustrated in FIG. 10, the catalyst monitor is the first monitor to be checked to determine if it is "ready" or "unsupported." If so, the readiness counter is incremented by a value of one (N=N+1), as indicated at block 324 of FIG. 10. Furthermore, if the selector switch 124 (as described above with reference to FIG. 7) is set to "visual" or "both," as evaluated at decision 323, the indicator light 128 associated with the catalyst monitor (as shown in FIGS. 7 and 9) is illuminated to provide the operator with immediate visual notification that the monitor has been checked and is reporting as "ready" or "unsupported," as indicated at block 325. Each monitor is checked in this manner. Of course, if a particular monitor is reporting as "not ready," no value is added to the readiness counter, and the associated indicator light 128 is not illuminated.

Figure 11:
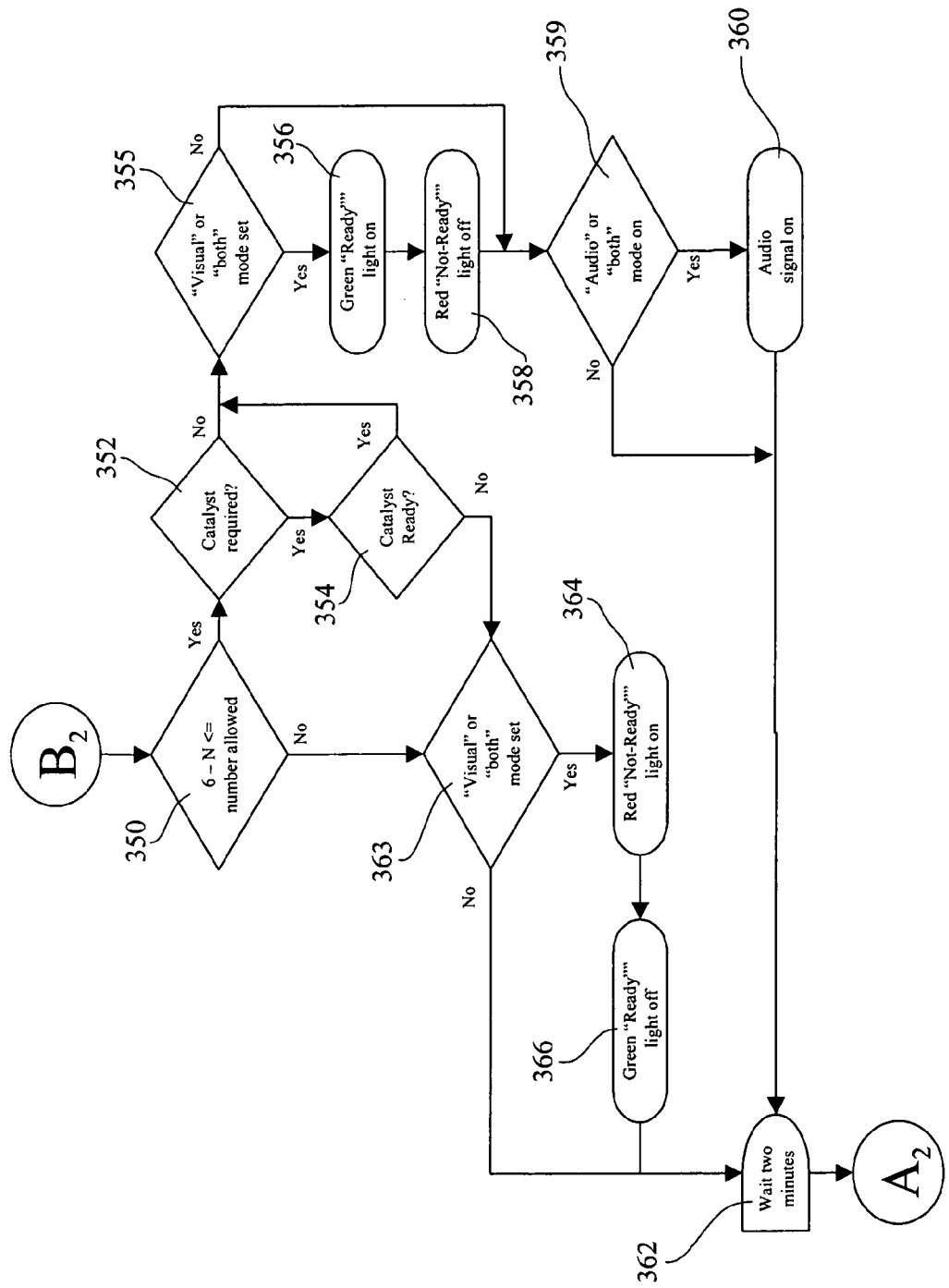

Referring now to FIG. 11, once all non-continuous monitors have been checked, the readiness counter will have a value, N, equal to the number of monitors that were reporting as "ready" or "unsupported." Accordingly, the value 6–N represents the number of non-continuous monitors that were reporting as "not ready." Thus, at decision 350, the value 6–N is compared to the value established by the selector switch 120 (as described above with reference to FIG. 7). If the value 6–N is less than or equal to the value established by the selector switch 120, the vehicle is ready for an I/M OBDII emissions inspection, at least with respect to the number of monitors that can be reported as "not ready." If the selector switch 122 (as described above with reference to FIG. 7) is set to "yes," as indicated at decision 352 of FIG. 6, then another determination must be made. Specifically, as indicated at decision 354, the notification device 110 independently checks whether the catalyst monitor is reporting as "ready," and if so, the vehicle is ready for an I/M OBDII emissions inspection. Accordingly, if the selector switch 124 (as described above with reference to FIG. 7) is set to "visual" or "both," as evaluated at decision 355, the "ready" light 118 (as shown in FIGS. 7 and 9) is illuminated, as indicated at block 356, and the "not ready" light 116 (as also shown in FIG. 9) is extinguished, as indicated at block 358. Then, if the selector switch 124 is set to "audio" or "both," as evaluated at decision 359, an audio signal is also emitted, as indicated at block 360. Finally, as illustrated in the flow chart of FIG. 11, after a predetermined time period (e.g., two minutes) as indicated at block 362, the process is re-initiated with the notification device 110 again electronically requesting the readiness status of each of the six non-continuous OBDII monitors.

Referring still to FIG. 11, if the value 6–N is greater than the value established by selector switch 120 at decision 350, or if the catalyst monitor is required to be "ready" and is reporting as "not ready" at decisions 352, 354, then the vehicle is not ready for an I/M OBDII emissions inspection. Accordingly, if the selector switch 124 is set to "visual" or "both," as evaluated at decision 363, the "not ready" light 116 (as shown in FIGS. 7 and 9) is illuminated, as indicated at block 364, and the "ready" light 118 (as also shown in FIGS. 7 and 9) is extinguished, as indicated at block 366. Then, after a predetermined time period (e.g., two minutes) as indicated at block 362, the process is re-initiated with the notification device 110 again electronically requesting the readiness status of each of the six non-continuous OBDII monitors.

While the invention has been described in conjunction with two exemplary embodiments thereof, it will be obvious to those skilled in the art that other modifications may also be made to these embodiments without departing from the spirit and scope of the present invention.

What is claimed is:

1. A device for notifying an operator of the readiness of a vehicle for emissions testing, comprising:
   a housing containing a control logic for evaluating a status of each of a plurality of the monitors of an on-board diagnostics (OBDII) system of the vehicle;
   a connection port adapted to mate with a diagnostic link connector of the OBDII system, placing the control logic in electrical communication with the OBDII system; and
   an indicator for notifying the operator when the vehicle is determined to be ready for emissions testing based on the status of each evaluated monitor of the OBDII system.

2. The device of claim 1, in which the indicator is a light that is illuminated when the vehicle is determined to be ready for emissions testing.

3. The device of claim 1, in which the indicator is an audio signal emitted by the device when the vehicle is determined to be ready for emissions testing.

4. The device of claim 1, wherein the vehicle is considered ready for emissions testing when less than a predetermined number of the monitors report a status of "not ready."

5. The device of claim 4, and further comprising a selector switch allowing the operator to establish the value of the predetermined number of the monitors that may report a status of "not ready."

6. The device of claim 1, and further comprising a selector switch allowing the operator to indicate whether the catalyst monitor must be reporting as "ready" in order for the vehicle to be considered ready for emissions testing.

7. The device of claim 5, and further comprising a selector switch allowing an operator to indicate whether the catalyst monitor must be reporting as "ready" in order for the vehicle to be considered ready for emissions testing.

8. The device of claim 1, in which the indicator includes both a light that is illuminated when the vehicle is determined to be ready for emissions testing, along with an audio signal emitted by the device when the vehicle is determined to be ready for emissions testing.

9. The device of claim 8, and further comprising a selector switch allowing an operator to indicate whether the light is illuminated, the audio signal is emitted, or both when the vehicle is determined to be ready for emissions testing.

10. The device of claim 1, and further comprising a plurality of individual indicator lights, each indicator light corresponding to a particular evaluated monitor, and each indicator light being illuminated when the corresponding monitor is reporting as "ready" or "unsupported."

11. A method for determining when a vehicle is ready for emissions testing and notifying an operator of the same, comprising the steps of:
- continuously evaluating monitors of an on-board diagnostics (OBDII) system of a vehicle through a device connected to the diagnostic link connector of the OBDII system;
- counting the number of monitors reporting as "not ready"; and
- notifying the operator when the number of monitors reporting as "not ready" is less than or equal to a predetermined threshold, and indicating that the vehicle is ready for emission testing, based on a status of each evaluated monitor.

12. The method of claim 11, wherein the step of notifying the operator is achieved through a visual indicator light on a surface of the device that is illuminated when the number of monitors reporting as "not ready" is less than or equal to the predetermined threshold.

13. The method of claim 11, wherein the step of notifying the operator is achieved through an audio signal emitted by the device when the number of monitors reporting as "not ready" is less than or equal to the predetermined threshold.

14. The method of claim 11, wherein the device connected to the diagnostic link connector includes a selector switch which allows the operator to establish the predetermined threshold.

15. The method of claim 11, wherein the device connected to the diagnostic link connector includes a plurality of individual indicator lights, each indicator light corresponding to a particular evaluated monitor, and each indicator light being illuminated when the corresponding monitor is reporting as "ready" or "unsupported."

16. A method for determining when a vehicle with an on-board diagnostics (OBDII) system is ready for electronic interrogation of the OBDII system as part of an emissions inspection, comprising the steps of:
- connecting a notification device to the OBDII system, said notification device having a control logic capable of evaluating a status of one or more monitors of the OBDII system;
- evaluating the status of said one or monitors of the OBDII system; and
- notifying an operator when the control logic of the notification device determines that the vehicle is ready for the electronic interrogation of the OBDII system based upon its evaluation of the monitors of the OBDII system.

17. The method of claim 16, wherein the step of notifying the operator is achieved through a visual indicator light on a surface of the notification device that is illuminated when the number of monitors reporting as "not ready" is less than or equal to a predetermined threshold.

18. The method of claim 17, wherein the notification device includes a selector switch which allows the operator to establish the predetermined threshold.

19. The method of claim 16, wherein the step of notifying the operator is achieved through an audio signal emitted by the notification device when the number of monitors reporting as "not ready" is less than or equal to a predetermined threshold.

20. The method of claim 19, wherein the notification device includes a selector switch which allows the operator to establish the predetermined threshold.

21. The method of claim 16, wherein the notification device includes a plurality of individual indicator lights, each indicator light corresponding to a particular evaluated monitor, and each indicator light being illuminated when the corresponding monitor is reporting as "ready" or "unsupported."

* * * * *

(12) EX PARTE REEXAMINATION CERTIFICATE (9085th)
United States Patent
St. Denis

(10) Number: US 7,012,512 C1
(45) Certificate Issued: Jun. 19, 2012

(54) OBDII READINESS STATUS NOTIFICATION DEVICE

(75) Inventor: Michael St. Denis, Roseville, CA (US)

(73) Assignee: St. Denis Innovations LLC, Roseville, CA (US)

Reexamination Request:
No. 90/008,637, May 16, 2007

Reexamination Certificate for:
Patent No.: 7,012,512
Issued: Mar. 14, 2006
Appl. No.: 10/824,296
Filed: Apr. 14, 2004

(51) Int. Cl.
*B60Q 1/00* (2006.01)
B60Q 1/10

(52) U.S. Cl. .................. 340/438; 340/426.15; 340/439; 701/29.4; 701/32.7; 701/33.2

(58) Field of Classification Search ................. 324/537, 324/551
See application file for complete search history.

(56) References Cited

To view the complete listing of prior art documents cited during the proceeding for Reexamination Control Number 90/008,637, please refer to the USPTO's public Patent Application Information Retrieval (PAIR) system under the Display References tab.

*Primary Examiner* — Samuel Rimell

(57) ABSTRACT

A device for notifying an operator of the readiness of a vehicle for emissions testing includes a control logic for evaluating the status of each of a plurality of the monitors of an on-board diagnostics (OBDII) system of the vehicle. Once the vehicle is determined to be ready for emissions testing based on the status of each evaluated monitor of the OBDII system, an indicator light is illuminated and/or an audio signal is emitted to notify the operator.

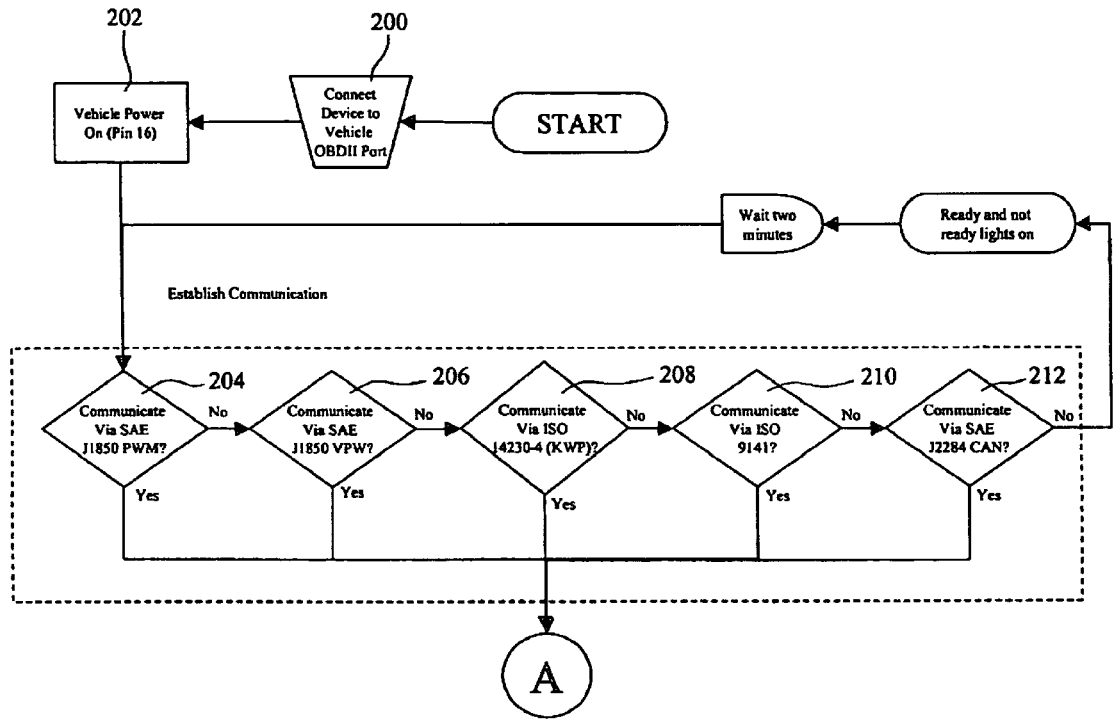

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-21 are cancelled.

* * * * *